July 13, 1948.  C. E. GALLAGHER  2,444,927
AUTOMATIC BRAKING SYSTEM FOR AIRCRAFTS
Filed Oct. 29, 1945  3 Sheets-Sheet 1
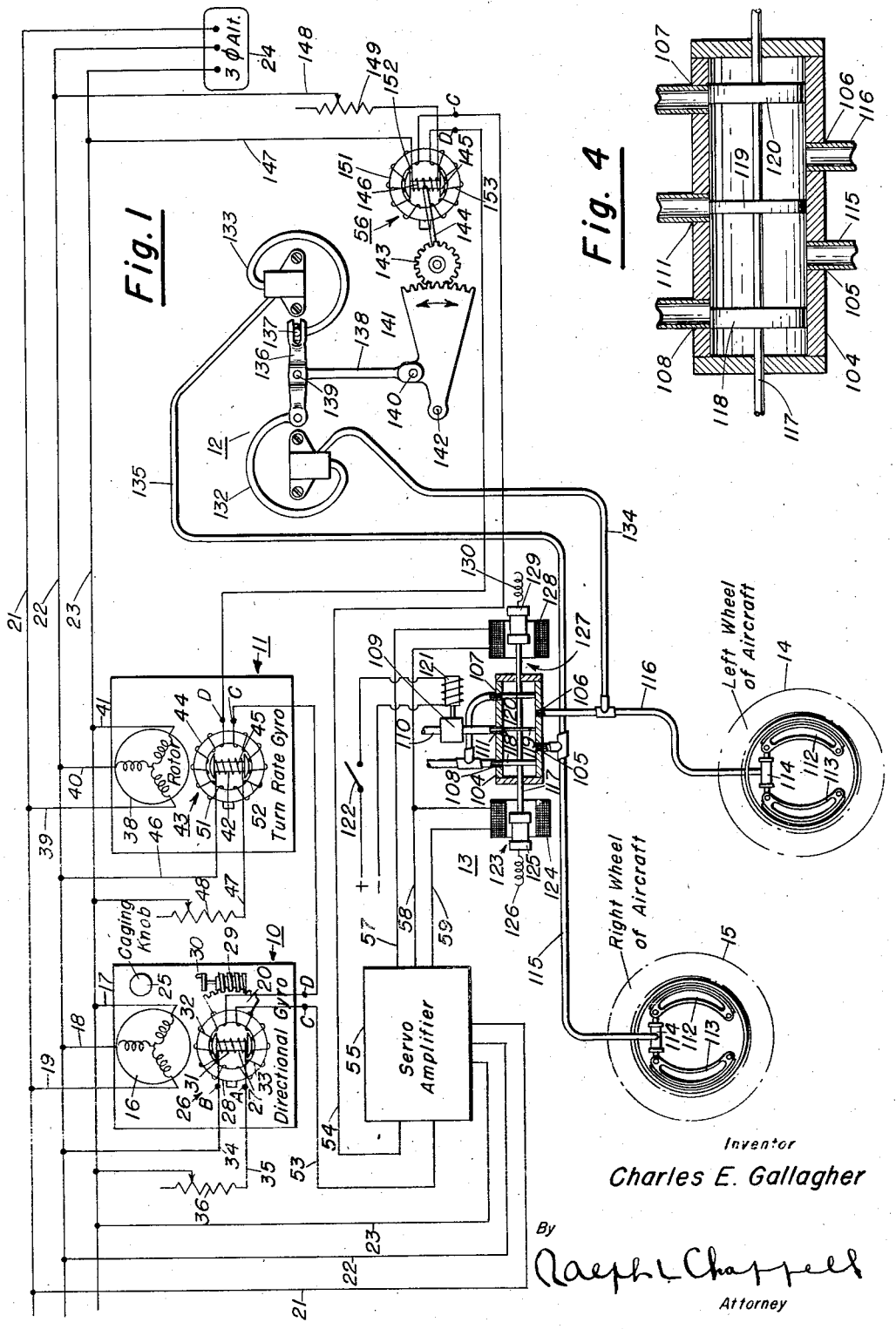
Inventor
Charles E. Gallagher
By
Ralph L. Chappell
Attorney July 13, 1948. C. E. GALLAGHER 2,444,927
AUTOMATIC BRAKING SYSTEM FOR AIRCRAFTS
Filed Oct. 29, 1945 3 Sheets-Sheet 2
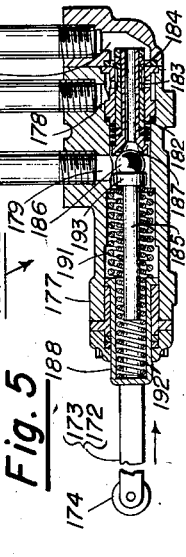
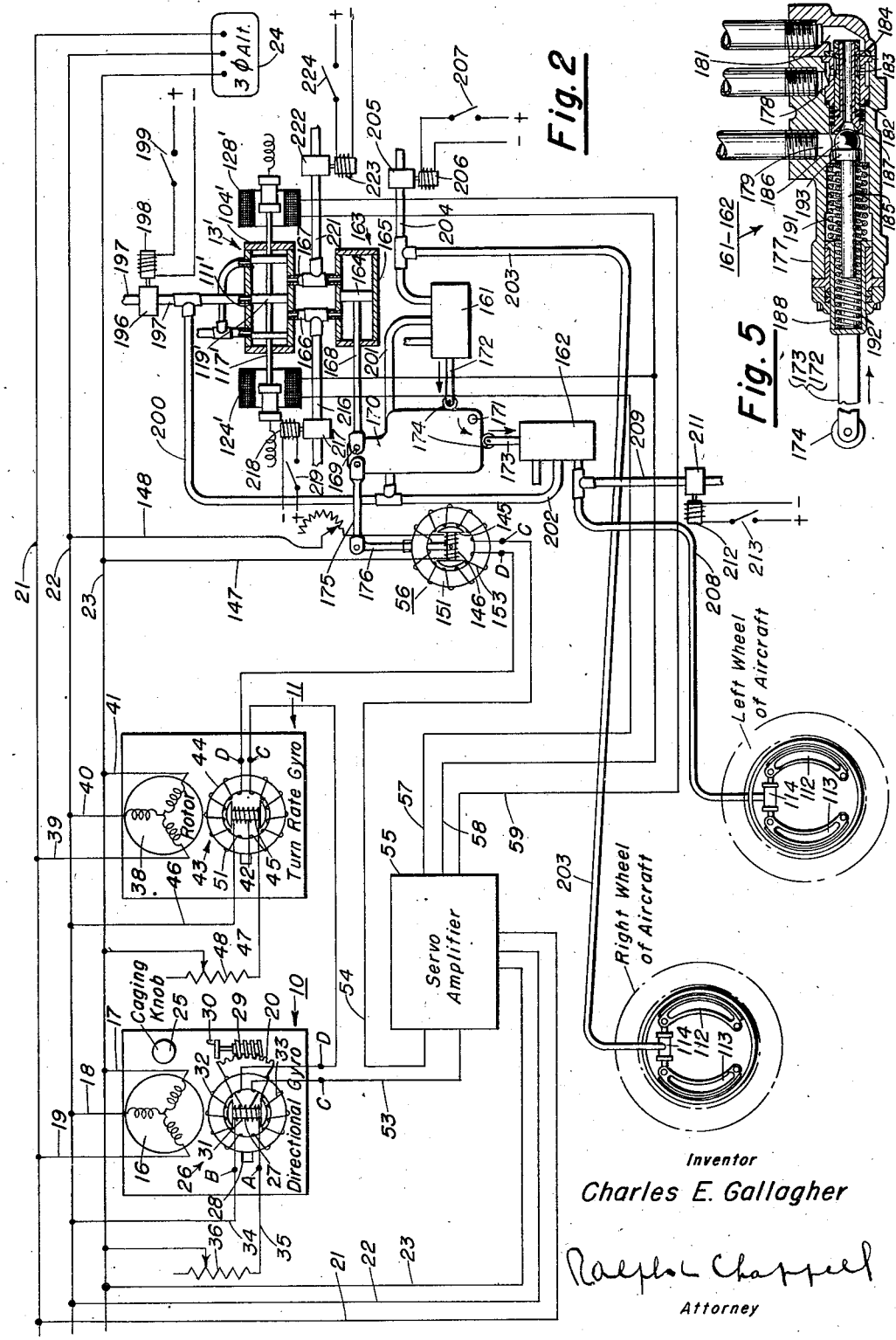
Inventor
Charles E. Gallagher
Ralph Chappell
Attorney Inventor
Charles E. Gallagher
By Ralph L Chappell
Attorney Patented July 13, 1948

2,444,927

UNITED STATES PATENT OFFICE 2,444,927

AUTOMATIC BRAKING SYSTEM FOR AIRCRAFT

Charles E. Gallagher, Doylestown, Pa.

Application October 29, 1945, Serial No. 625,423

7 Claims. (Cl. 244—111)

(Granted under the act of March 3, 1883, as amended April 30, 1928; 370 O. G. 757)

This invention relates in general to brake systems and in particular to a novel differential brake system for aircraft which functions automatically to maintain the aircraft on a preselected heading while it is being braked to a stop.

The arrangement is such that when the fore-and-aft axis of the aircraft is aligned on a selected heading, which heading would normally be the longitudinal axis of the runway, an equal amount of braking force is applied to each wheel. However, should the heading of the aircraft depart from the runway axis, the braking force on one wheel will be automatically increased while that on the other wheel paired therewith will be automatically and simultaneously decreased to the end that the increased braking effect in the one wheel will then bring the aircraft heading back into alignment with the runway axis.

It is present practice to provide aircraft, and especially those aircraft having a high landing speed characteristic, with brakes for the left and right front landing wheels. The brakes for each of these wheels are arranged for operation independently by the pilot, usually by means of auxiliary pedals located on the main foot pedals by which the pilot controls operation of the aircraft rudder. After the pilot has brought the aircraft into a landing on the runway strip and the aircraft wheels have made contact with the runway, the pilot then endeavors to apply an equal braking effect to each of the wheels so that the aircraft can be brought to a stop without veering off the runway. However, should the aircraft tend to turn either one way or the other after the brakes have been applied, the pilot will increase the braking effect on one of the wheels and simultaneously decrease the braking effect on the other wheel in order to bring the aircraft back on the selected landing course. Thus, for example, should the aircraft tend to turn to the right, the pilot will then press down harder with his left foot and ease off the pressure applied with his right foot thereby applying a greater force to the left wheel and a lesser force to the right wheel. By doing this, the nose of the aircraft is swung back until the fore-and-aft axis of the aircraft is again in alignment with the selected landing course.

It is thus seen that by using a manually applied differential type of braking described above, the pilot is, to a certain extent, able to control the course of the aircraft after the landing wheels have touched the ground, and the speed of the aircraft has been reduced to such an extent that the latter cannot be controlled very well by the rudder.

While a manually operated differential braking system may be satisfactory for some aircraft, it is obvious that a fully automatic differential braking system possesses many advantages over one that is manually operated.

The trend in aircraft design is towards larger and, of course, much heavier and higher speed planes. As the weight and speed factors increase, the landing speeds also increase. Thus braking of the plane becomes more difficult to control manually, since only a very small amount of incorrectly applied braking force will send the plane veering off the runway.

The invention is also useful for providing automatic steering of the plane on landing and prior to "take-off."

Also in operations where it is desired that a pilotless plane be controlled remotely, such as by radio, a braking system of the automatic type made in accordance with principles of this invention now makes it practical to land the heavier type planes with high landing speeds.

Automatic differential braking systems will also be very useful in blind landing operations where only the landing course is known. The pilot can set the braking controls to the selected landing course, and the plane will then be automatically braked to a stop without veering or hunting from such course.

Then too, since the pilot of a present day large aircraft already has so many other duties to perform, the desirability of relieving him from the further duty of applying the plane's brakes manually becomes obvious.

The general object of my invention is therefore to provide an automatically operated brake system for aircraft so that the plane may be brought safely to a stop without veering or oscillating from the selected landing heading.

A more specific object is to provide an automatically operated brake system in which the amount of braking force applied to each of paired landing wheels of the aircraft is controlled by the magnitude and sense of a pick-off signal produced by a directional gyroscope mounted on the aircraft.

These and other objects of the invention will become more apparent from the following detailed description and the accompanying drawings which illustrate preferred embodiments of the invention.

In the drawings,

Fig. 1 is a diagrammatic view of one embodiment of the invention;

Fig. 2 is also a diagrammatic view illustrating a modified construction of my novel automatic differential braking system;

Fig. 4 is an enlarged longitudinal section view of the transfer valve component of the system in Fig. 1; and Fig. 5 is a longitudinal section, somewhat enlarged, of one of the secondary valves utilized in the Fig. 2 embodiment of the invention.

Figure 3:
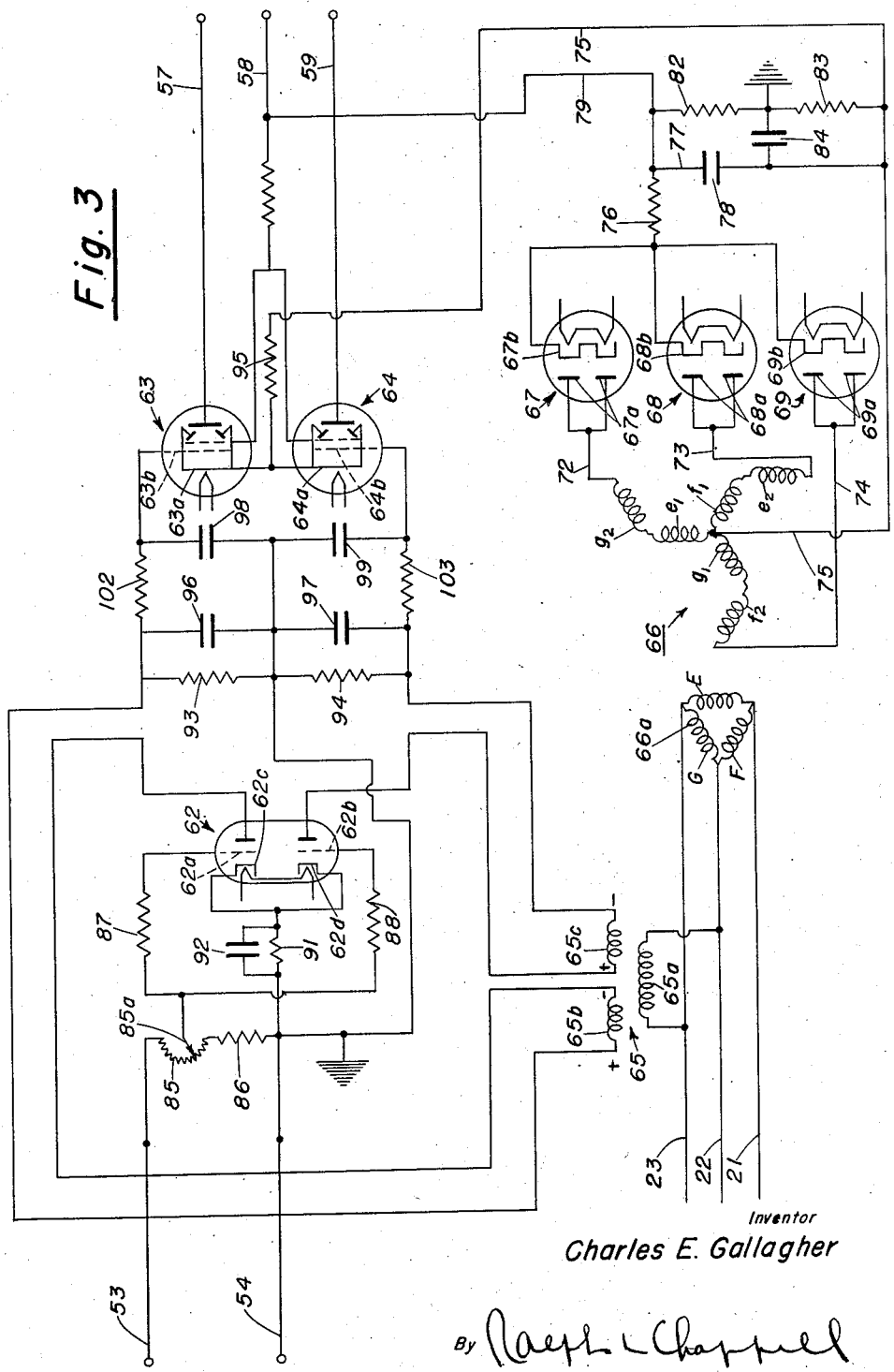
Fig. 3 is a circuit diagram of the servo amplifier component which is used in both the Fig. 1 and Fig. 2 arrangements.

Referring now to Fig. 1, it is seen that the principal components of my automatic braking system include a directional gyroscope 10, a rate-of-turn gyroscope 11, a pressure actuated hydraulic follow-up device 12, and a transfer valve 13 for establishing a hydraulic fluid pressure differential which is then applied to the left and right paired wheels 14 and 15, respectively, of the aircraft. Other than the wheels and brakes, no parts of the aircraft have been illustrated in order to simplify the drawings.

The directional gyroscope

The directional gyroscope 10 is of conventional construction, the one illustrated being of the electrically driven type which includes a 3-phase motor-gyro element 16 connected via conductors 17, 18 and 19 to 3-phase power supply mains consisting of conductors 21, 22 and 23. A 3-phase alternator 24 feeds the 3-phase mains.

In accordance with conventional directional gyroscope construction, the gyro rotor element 16 is carried by an inner gimbal ring with the spin axis of the rotor arranged in a horizontal plane. The inner ring is pivotally supported by an outer gimbal ring, the latter in turn being pivotally supported by the instrument housing. The gimbal suspension being conventional, no details of its construction have been thought necessary. The directional gyroscope 10 is also provided with any of the well known types of caging mechanisms which function to lock the inner and outer gimbals with respect to the instrument housing. The caging mechanism being conventional, only a knob 25 for actuating it has therefore been illustrated. This knob is customarily positioned on the front panel of the instrument housing.

The directional gyroscope instrument 10 is installed on the aircraft in such a manner that when the inner and outer gimbals are caged, the spin axis of the gyro rotor 16 is aligned with the fore-and-aft, i. e., longitudinal axis of the aircraft.

Gyroscope 10 includes a pick-off device 26, also of conventional construction, for generating signals proportional to the amount by which the aircraft departs from the spin axis to which the gyro rotor element 16 is set for braking, as will be more fully explained hereinafter.

This device converts deviation from any selected landing course into an A. C. voltage, the magnitude of which is proportional to the amount of deviation, and the instant polarity of which is dependent upon the direction or sense of the deviation from the selected landing course.

The pick-off device 26 consists of two parts, a rotor 27 attached to the vertical or outer gimbal pivot and a stator 28 attached to the stationary instrument frame. The rotor 27 is composed of a group of dumb-bell shaped iron laminations around the shank of which a coil 31 is wound. The stator 28 is composed of a ring of iron laminations around which two coils 32 and 33 are wound in opposite paths. The two stator coils 32, 33 are connected in series opposition.

The coil winding 31 on the rotor 27 is connected via conductors 34, 35 and potentiometer 36 to one phase (conductors 22, 23) of the 3-phase A. C. supply mains.

When winding 31 on rotor 27 is excited with alternating current from the A. C. mains 22, 23, it produces an alternating flux. When rotor 27 lies in the position shown in Fig. 1, this flux enters and leaves the middle of each of the stator windings 32, 33 so that the flux in one-half of each winding is equal in magnitude but opposite in direction to that in the other half. The flux being alternating, voltages will be generated in the stator windings 32, 33; but since there is an equal amount of flux flowing in opposite directions through each half of each winding, the voltage across each of the windings 32, 33 will be zero because the voltage produced in each half of each winding is equal and opposite. Thus, for the position of the rotor 27 shown in Fig. 1, there will be no voltage across terminals C—D, even though the rotor winding 31 is excited.

Now, should the rotor 27 be turned 90° counterclockwise from the position shown in Fig. 1, its magnetic flux field, of course, rotates with it. Each of the two stator coils 32, 33 is then traversed by the same flux flowing in one direction throughout its entire length so that a voltage is generated across each of the windings 32, 33. These two windings being connected in series, the two voltages add across terminals C—D, and terminal C becomes positive during the same half cycle that terminal A of the rotor winding 31 is positive.

Should the rotor 27 be turned 90° clockwise from the position shown in Fig. 1, the flux pattern linking the stator coils 32, 33 is such as to produce an effect which is opposite to that produced when the rotor 27 is rotated 90° counterclockwise. That is to say, terminal D, instead of terminal C, then becomes positive during the same half cycle that terminal A is positive.

Should the rotor 27 be turned only slightly away from the position of zero voltage output, it will be evident that more turns of each of the two stator coils 32, 33 will be linked by magnetic flux going one way than by magnetic flux going the other way, so that there is a net voltage across output terminals C—D, but not so much as there would have been had the rotor element 27 been turned 90°. Thus, for example, should the rotor element 27 be rotated clockwise from the position shown in Fig. 1, through an angle of, say, 45°, terminal D would have the same polarity as terminal A during the same half cycle, but the voltage across terminals C—D would not be as great as when the rotor 27 is turned through a full 90°.

The stator element 28 of pick-off unit 26 may be adjusted manually relative to the rotor 27 and serves a purpose which will be fully explained in another part of this specification. The structure for permitting such manual adjustment includes a sector gear 20 integral with stator 28 and meshed with a worm gear 29 that is turned by a crank 30.

The details for mounting the rotor and stator elements of the pick-off device 26 on the vertical gimbal pivot and instrument frame, respectively, of the directional gyro instrument 10 have not been illustrated, since the arrangement is well known to the art, it being common at the present time to use a directional gyro with this type of pick-off in automatic pilot apparatus.

*The rate-of-turn gyroscope*

In addition to the directional gyro instrument 10, and the pick-off device 26 associated therewith for producing a control signal in accordance with the magnitude and sense of the departure of the aircraft from the selected landing course, it has been found desirable to further include the rate gyro instrument 11 from which there is produced a control signal that varies with the rate at which the aircraft departs from the selected landing course. Such a signal increases the sensitivity of the system, for when it is superimposed upon the signal from the directional gyro 10, any tendency of the aircraft to oscillate or hunt about the selected landing course is greatly reduced.

The rate gyro 11, which may be of conventional construction, includes a gyro rotor 38 which may be constituted by the rotor element of a 3-phase motor also operating from the 3-phase power supply mains 21—23, and connected thereto by conductors 39, 40 and 41. The rate gyro 11 is mounted in the aircraft so that the spin axis of the gyro rotor lies in a horizontal plane athwartships, that is to say, normal to the fore-and-aft axis of the aircraft. The gyro rotor 38 turns in a housing which is supported to rotate about the fore-and-aft axis of the aircraft. However, movement of the gyro housing is restrained by adjustable centering springs. Any change in the heading of the aircraft causes the rate gyro to precess and to thereby tilt the housing in which it spins. The housing will be tilted to the right for a left turn and to the left for a turn towards the right, the movement being closely proportional to the aircraft's rate of turn.

The shaft which supports the movable gyro housing also carries the rotor element 42 of a second pick-off device 43. The stator element 44 of the second pick-off device 43 is secured to the outer and stationary frame of the rate gyro instrument. Preferably, the second pick-off device 43 is of the same construction of the first pick-off device 26. That is, the rotor 42 includes a coil 45 wound thereon which is connected via conductors 46, 47 and potentiometer 48 to conductors 22, 23 of the 3-phase A. C. supply mains 21—23. The stator 44 has two coils 51, 52 wound thereon in opposite directions and connected in series opposition, the same as in pick-off device 26.

Thus, as the aircraft turns off the selected landing course, the rotor 42 of the second pick-off device 43 rotates with the gyro housing and produces at the output terminals C—D of the stator windings 51, 52 a voltage signal proportional to the rate at which the aircraft is turning.

The details of the construction of the rate gyro instrument 11 have not been illustrated since they are well known in the art, it being common at the present time to incorporate a gyro which puts out an electrical signal in accordance with the rate-of-turn of the aircraft in automatic pilot systems. As with the pick-off device 26 associated with the directional gyro instrument 10, the amplitude of the signal voltage appearing across the output terminals C—D of the stator windings 51 and 52 will be proportional to the amount by which the rotor 42 is turned relative to stator 44; the instant polarity of the signal voltage will be determined by the direction in which the rotor 42 rotates from its no-signal, or zero voltage position.

*The servo amplifier*

The output signal voltage from pick-off device 26 associated with the directional gyro instrument 10 is connected in series with the output signal voltage derived from pick-off device 43 associated with the rate gyro instrument 11, and the two series-connected signal voltages are fed via conductors 53, 54 into the input of a servo amplifier unit 55.

It should also be noted that the instant polarity of the rate signal from rate gyro 11 will be the same as that of the signal from the directional gyro 10 when the turn has the same sense as the displacement. However, as soon as the differential braking effect stops the turning of the aircraft, and the displacement signal then begins to decrease as the aircraft comes back on the selected heading, the turn-rate signal then becomes reversed. That is, its instant polarity is now opposite from that of the displacement signal and the two series-connected signals will subtract from each other. Also connected in series with these two signal voltages is the output signal voltage from a third pick-off device 56 which is actuated by the hydraulic differential pressure follow-up device 12. A more detailed description of the follow-up unit 12 and pick-off 56 is included hereinafter.

Servo amplifier 55 is of conventional construction and produces two electrical output voltages which appear across the three conductors 57, 58 and 59, the middle conductor 58 serving as a common conductor for both output voltages. The arrangement is such that when the algebraic sum of the pick-off signals derived from the three pick-off devices 26, 43 and 56 is equal to zero, the voltage appearing between conductors 57 and 58 of the output of amplifier 55 is equal to that appearing between conductors 58 and 59. However, under operating conditions such that the algebraic sum of these three signal voltages is greater than zero, the voltage appearing across output conductors 57 and 58 of amplifier 55 will be greater or less, as the case may be, than the voltage appearing across output conductors 58 and 59.

Referring now to the Fig. 3, the servo amplifier unit 55 is seen to consist of two stages. The first stage is constituted by a double triode tube 62 which may be a type 6SL7. The second stage of the amplifier is comprised of two beam power tubes 63 and 64 of the 25L6 type.

The power supply for the servo amplifier unit 55 includes a single-phase transformer 65. This transformer has a single primary winding 65a connected to conductors 22, 23 of the 3-phase supply mains, and a pair of secondary windings 65b, 65c which are connected, as clearly shown, to supply necessary voltage for the two anode circuits of the first stage double amplifier tube 62.

A second transformer 66 is included to supply the necessary voltage for the anode circuits of three rectifier tubes 67, 68 and 69 which may be of the 6X5 type. This type tube is a double diode with both halves operating in parallel. As clearly shown, the primary 66a of transformer 66 is connected in delta across the 3-phase supply mains 21, 22 and 23. The primary windings are indicated as E, F and G. Two secondaries are located on the core of each primary. Primary E and secondaries $e_1$ and $e_2$ are on the same core and therefore have voltages which are in phase with each other. Phases F and G are similar to phase E, the secondaries of these two phases being indicated by the reference numerals $f_1$, and $f_2$ and $g_1$, and $g_2$, respectively. The secondaries are connected zigzag, so that each line-to-neutral circuit has two secondaries of different phases in series. Output leads 72, 73 and 74 are connected to the anodes 67a, 68a and 69a of the three rectifier tubes 67, 68 and 69, and a neutral lead 75 serves as the negative return. The cathodes 67b, 68b and 69b of the three rectifiers 67—69 are connected together, and through a 100 ohm filter resistor 76 to lead 77 and filter capacitor 78. This combination forms a 3-phase full wave rectifier which produces a smooth D. C. output voltage, and which voltage is applied via leads 75 and 79 to the anode circuits of the second stage amplifier tubes 63 and 64.

Resistors 82 and 83 are connected in series across leads 75, 79 and their common point is grounded. The voltage drop across resistor 83 and its parallel capacitor 84 provides a positive bias for the grids 63b, 64b of the second stage amplifier tubes 63, 64.

The first stage of amplifier 55 also includes a potentiometer 85 and resistor 86 connected in series across the input leads 53, 54, and the slider arm 85a of this potentiometer is connected to both control grids 62a, 62b of the double triode 62 by way of grid-current-limiting resistors 87, 88. Both cathodes 62c, 62d of amplifier 62 are connected together; they are also connected to input lead 54 through paralleled bias resistor 91 and smoothing capacitor 92. As to operation of the first stage of amplifier 55, it is seen that when the voltage appearing across input leads 53, 54 of amplifier 55 is zero, both control grids 62a, 62b of the double triode 62 are at the same potential with respect to the cathodes 62c, 62d, and this voltage is the drop across the bias resistor 91. The secondary transformer windings 65b and 65c are connected so that at any instant, the voltage across one is exactly the reverse of the other. Since a vacuum tube conducts only when its anode is positive with respect to the cathode, the two halves of the double triode 62 will conduct during alternate half cycles, and have zero current during the other half cycle. In flowing through resistors 93, 94, these currents produce corresponding voltage drops directly proportional to the current at every instant. Both currents flow in the cathode circuit through resistor 91 and capacitor 92. The filter smooths this out to a smooth D. C. voltage which is positive at the cathode end and negative at the grounded end to which the grids 62a, 62b are connected. Thus, the grids have a negative bias which is the drop across resistor 91 and capacitor 92.

As to the second stage of amplifier 55, it is seen that the grid voltage of the second stage amplifier tubes 63, 64 is made up of three components. Starting from the cathodes 63a, 64a, there is first a negative drop in stabilizing resistor 95, caused by the passage of the cathode current through this resistor on its way to the rectifier-transformer neutral. Changes in power supply voltage tend to change the current, and hence the voltage drop across resistor 95, but the changed drop changes the grid voltages in the direction to make the current return towards its original value. Thus, resistor 95 tends to stabilize the current at a constant value over a considerable range of power supply voltage.

The stabilizing resistor 95 is connected to the negative D. C. supply lead 75, which is displaced from ground by the voltage drop across resistor 83 and capacitor 84. This introduces a positive voltage in the circuit from cathode 63a to grid 63b, and cathode 64a to grid 64b, which is the second component.

The third component is the voltage drop across resistor 93 or resistor 94 in the first stage circuit, smoothing out to a direct current by capacitors 96, 97, 98, 99, and resistors 102 and 103. This voltage component is negative.

With this circuit arrangement, and under a condition of zero voltage input signal voltage to amplifier 55, the grid voltages of the second stage amplifiers 63, 64 will be equal; the two tubes then have equal anode currents. That is to say, the voltage drop appearing between output leads 57 and 58 is equal to that appearing between leads 58 and 59, which constitute the two outputs of the amplifier 55 that are used to control the operation of the transfer valve unit 13, previously mentioned. The nature of this control will be explained in further detail hereinafter in connection with that portion of the specification covering operation of the transfer valve in the braking system.

*The transfer valve*

The transfer valve 13 is provided for the purpose of converting the electric pick-off signals put out by the direction and rate-of-turn gyros, 10 and 11, into hydraulic signals in order to apply braking force to each of the landing wheels 14 and 15. Valve 13 includes a cylindrical valve body 104 having a pair of high-pressure outlet ports 105 and 106, drain or low pressure return ports 107 and 108, and a high fluid pressure inlet port 111.

The landing wheels 14, 15 of the aircraft are provided with any conventional type of hydraulic brake structure which may comprise arcuate brake shoes 112, 113, and which are actuated by a piston movable in opposite directions within a hydraulic brake cylinder 114. A conduit 115 connects outlet port 105 of transfer valve 13 to brake cylinder 114 on the right wheel 15. Similarly, the brake cylinder 114 of the left landing wheel 14 connects with outlet port 106 via conduit 116.

Slidable transversely within the transfer valve body 104 is a stem 117 which carries three valve port operators or pistons 118, 119 and 120. Stem 117 extends out of both ends of the valve body 104 and a solenoid is associated with each end of this stem.

Solenoid 123 includes a coil winding 124, a plunger 125 which is secured to one end of the stem 117, and a spring 126 for maintaining the plunger 125 in a definite position with respect to winding 124. Similarly, the other solenoid 127 includes an energizing coil winding 128, a plunger 129 secured to the other end of stem 117, and a spring 130. Solenoid winding 124 is connected to conductors 58 and 59 which, as previously explained, constitute one output from servo amplifier 55; winding 128 of the other solenoid 127 is connected to conductors 57 and 58, constituting the other output from amplifier 55.

When the two outputs of amplifier 55 are equal in magnitude (which is the condition that prevails when the algebraic sum of the pick-off voltages serving as inputs to the amplifier is zero), the forces acting upon plungers 125 and 129 are equal in magnitude but opposite in sense, with the result that the three valve port operators 118—120 are maintained in a neutral position, which is the position shown in Fig. 1. Referring now to Fig. 4, it is clearly seen that when in a neutral position, the valve port operator 119 is centered with respect to the high pressure fluid inlet port 111, and that the latter is uncovered slightly an equal amount on both sides of the port operator 119. Thus, an equal amount of hydraulic force is applied through the valve body 104 and via conduits 115 and 116 to the brake cylinder 114 of each of the two wheels 14 and 15, with the result that each of the wheels 14, 15 receives an equal amount of braking force.

Under conditions where the pick-off voltages are not zero, a differential hydraulic force is applied to the left and right wheel brakes, the differential in braking force being in such direction as to reduce the pick-off signal voltages to zero. For example, let it be assumed that a pick-off alternating current signal voltage appears across input leads 53, 54 of amplifier 55, and that such voltage is in phase with the voltage between conductors 22, 23 of the 3-phase supply mains (that is, lead 53 is positive during the same half cycle that conductor 23 is positive). Depending upon the setting of potentiometer arm 85a, part or all of this signal voltage will appear between ground and the grids 62a, 62b of the double triode 62, causing the anode currents through load resistors 93, 94 to become unbalanced. This, in turn, makes the voltage on grid 63b of tube 63 in the second stage of the amplifier more negative and the voltage on grid 64b of tube 64 less negative. The effect of this change in grid voltages on the beam power tubes 63, 64 is to unbalance their respective anode currents so that the current through solenoid winding 128 is decreased, while the current through solenoid winding 124 is simultaneously increased. The magnetic pulls of the two solenoids 123, 127 are thereby unbalanced, causing the valve stem 117 to move to the right. This increases the pressure on the fluid passed from the high-pressure inlet port 111 to the outlet port 105 through conduit 115 and to the brake cylinder 114 in the right wheel 15. Simultaneously therewith, the pressure on the fluid passed from inlet port 111 to outlet port 106, conduit 116, and to brake cylinder 114 in the left wheel 14 is decreased.

If the instant polarity of the pick-off signal voltage is reversed, that is, lead 54 is positive during the same half cycle that conductor 23 on the 3-phase mains is positive, a reverse effect will take place. The brake pressure applied to the left wheel 14 will then be increased, while that applied to right wheel 15 will be decreased.

A valve 109 is placed in the high-pressure inlet conduit 110 in order to release the pressure from the brakes when the latter are not in use, as for example, during take-off of the aircraft. This valve may be controlled by a solenoid 121 which is energized by closing switch 122.

The follow-up unit

The hydraulic differential pressure follow-up device 12, previously mentioned, is included for the purpose of controlling the amount of the differential in brake pressures applied to the left and right aircraft wheels 14 and 15, respectively, for a given pick-off signal, and to restore equal braking pressures to the wheels 14, 15 when the gyro controls have made such correction as has been necessary to bring the fore-and-aft axis of the aircraft back into alignment with the selected landing course or heading.

Included in the follow-up device 12 are a pair of Bourdon tubes 132 and 133. The inner end of tube 132 is connected via conduit 134 into conduit 116 so that tube 132 therefore becomes responsive to the hydraulic pressure in conduit 116. Similarly, the inner end of Bourdon tube 133 is connected via conduit 135 to conduit 115, thus rendering tube 133 responsive to the pressure of the fluid in conduit 115.

The opposite ends of Bourdon tubes 132 and 133 are connected respectively to opposite ends of a transverse and floating link 136, it being noted that while the end of tube 132 terminates in a fixed pivot at the left end of link 136, the end of tube 133 engages a forked portion 137 at the right end of this link. One end of a vertical link member 138 is pivotally connected at 139 to the cross link 136, and the opposite end of link 138 is pivotally secured at 140 to a sector gear 141, the latter being mounted for rotation about a fixed pivot 142. The teeth in sector gear 141 are meshed with pinion gear 143 to which a shaft 144 is connected. Shaft 144 rotates the rotor element 145 of the pick-off unit 56, previously mentioned. This pick-off is of the same construction as the other two pick-off units 26 and 43, which have been previously described. That is, pick-off 56 includes a winding 146 on the rotor element 145, such winding being connected via conductors 147, 148 and potentiometer 149 to conductors 22, 23 on the 3-phase supply mains 21—23. The stator element 151 of the pick-off unit 56 includes windings 152, 153 that are arranged in series opposition, and connected in series at terminals C—D with the outputs from the stator windings of the pick-off units 26 and 43 as previously explained.

It is thus seen that with the interconnected Bourdon tube and linkage arrangement described, any differential pressure which appears across the two Bourdon tubes 132 and 133 will effect motion of the differential linkage members 136, 138 and the sector gear 141 to thereby rotate the rotor element 145 of the pick-off device 56 through an angle proportional to such differential pressure. When the fluid pressures acting on tubes 132, 133 are equal, no rotation of rotor 144 takes place.

The electrical circuit arrangement is such that the instantaneous polarity of the pick-off signal produced by the pick-off unit 56 is always opposite from that produced by the pick-off device 10 that is controlled by the directional gyro 10. With this arrangement, it is therefore evident that the amount of difference in braking effect on the two wheels 14 and 15 will not exceed that which is called for by a given magnitude of pick-off signal from the gyro controls.

Operation of Fig. 1 system

Assuming a landing operation, the aircraft is first brought into the runway with the fore-and-aft axis of the aircraft in alignment with the landing course selected. The gyros 10 and 11 having been started sometime previously are now running at normal speed, and the amplifier 55 is energized. The gimbal system of gyro 10 is caged.

When it is desired to apply the brakes to wheels 14 and 15, the gyro 10 is uncaged by actuating knob 25 and the hydraulic supply turned on by closing switch 122. The resulting action is the application of pressure to the brake shoes 112, 113 of both wheels 14 and 15 equally, thus retarding the aircraft.

The brake pressure will remain equal so long as the aircraft remains on the exact heading or course held at the instant the brakes were first applied. Under these conditions, the pick-off signal output from the pick-offs in gyros 10 and 11 is zero, as is also the output from the pick-off device 56.

Now, should the aircraft depart from the selected landing course, the pressure will be increased on the correct brake and decreased on the opposite brake in response to the pick-off signals generated and acting through amplifier 55 and transfer valve 13. The differential in braking pressures will be proportional to the algebraic sum of the pick-off voltages put out from the pick-off units 26 and 43 in accordance with the relative rotation between the stator and rotor windings of these units, when the aircraft departs from the selected landing course. The amount of the differential in braking pressures is controlled by the follow-up unit 12, the pick-off unit 56 of which puts out a signal voltage proportional to the differential pressure and of opposite instant polarity to the combined signal voltages of the pick-off units 26 and 43, thus placing a balanced voltage on the servo amplifier 55 and centralizing the pistons 118—120 in transfer valve 13. Thus any time that the aircraft departs from the selected landing course, the transfer valve will operate and effect the necessary correction by establishing the differential braking forces. Actually, the transfer valve when in operation will be found to be oscillating at a rather high rate and holding a differential braking pressure strictly proportional to the changing conditions in the gyro signals.

The gradient of the pressure differential applied to the brakes of the left and right wheels 14, 15 may be adjusted to any desired slope by changing the setting of the potentiometers 36, 48 and 149 that are connected in circuit with the windings on the rotor elements of the pick-off devices 26, 43 and 56 previously described. The slope of the differential braking pressure will also of course vary with the rate at which the aircraft departs from the selected landing course. That is, the magnitude of the pick-off signal which is obtained from pick-off device 43 controlled by the rate gyro unit 11 also becomes a factor in establishing the slope of the brake pressure differential.

The instant polarity of the rate signal output from pick-off device 43 with respect to the instant polarity of the output signal from pick-off device 26 will be reversed as soon as the latter or displacement signal begins to decrease. The rate signal will therefore be subtracted from the displacement signal and hence cause a reversed braking differential to be set up as the aircraft approaches the selected landing course or heading thus resulting in a near critically damped control.

If it is desired to change the heading of the aircraft, say by 10°, the turn may be effected by rotating the stator element 28 of the pick-off device 26 through 10°. This is done by turning crank 30 which rotates worm 29 to thereby rotate sector gear 20 that is attached to stator 28, as previously explained. When stator element 28 is thus rotated relative to rotor element 27, a displacement signal is generated at the output terminals of pick-off device 26. This signal is in addition to that generated from gyro action and thus a differential braking, independent of gyro action, is established which thereby causes the aircraft to turn. When the aircraft has turned through 10°, and assuming no signal is then being generated by gyro action, the stator 28 will have been turned through 10° in the reverse direction from which it was rotated, and hence be once again in a position as shown in Fig. 1 which is the no-signal attitude. Under such conditions, the transfer valve is once again restored to the "neutral" position and the differential in braking pressures disappears.

Reference is now made to the modified form of my invention shown in Fig. 2. The embodiment in Fig. 2 differs from that in Fig. 1 in that instead of establishing the braking pressure differential at the transfer valve 13, a pair of secondary valves 161, 162 are utilized. The follow-up device is also modified. These valves are actuated by a servomotor 163 which is in turn controlled by the transfer valve. The construction of the transfer valve shown in the Fig. 2 embodiment differs slightly from that shown in Fig. 1 and, for this reason, has been designated by reference numeral 13' instead of numeral 13 which designates this valve in Fig. 1. For the same reason, the component parts of valve 13' have been given prime reference numerals. However, the directional gyro, the rate gyro, the pick-off devices associated with these gyros, and the servo amplifier components in the Fig. 2 embodiment are of the same construction as those in the Fig. 1 system and have therefore been given the same reference numerals as those used in Fig. 1.

It will be seen that piston 119' in the cylinder 104' of transfer valve 13' slightly overlaps the high pressure inlet port 111' when the valve stem 117' is in the center, or neutral position. Under this condition, the piston 164 of servomotor 163 will remain centered in cylinder 165 for the reason that the fluid pressure applied to the opposite sides of this piston from transfer valve 13' via conduits 166 and 167 are equal.

Piston rod 168 is pivotally connected at 169 to a plate 170, the latter being mounted for rotation about pivot 171. Associated with plate 170, on opposite sides of pivot 171, and equidistant from this pivot, are piston rods 172 and 173 of the secondary control valves 161 and 162. These piston rods include rollers 174 at their ends which are engaged with the sides of plate 170. Further, as shown clearly in Fig. 2, the rotor 145 of the pick-off device 56 is arranged to be rotated through pivoted link members 175 and 176, with one end of link 176 being connected to rotor 145 and one end of link 175 being connected to plate 170.

Referring now to Fig. 5, it is seen that each of the secondary control valves 161, 162 includes a casing 177, a high pressure inlet port 178, a low pressure return port 179 leading to a sump (not shown) and an outlet port 181. Supported within casing 177 for longitudinal movement is a tubular valve sleeve 182. Part of the latter is reduced in diameter to provide a passageway 183, which together with a valve head 184 function to control the flow of fluid from the high pressure inlet 178 to the outlet 181 which leads to the wheel brakes.

Motion of valve sleeve 182 is controlled by a rod 185 formed with a ball 186 on one end that is adapted to enter a conical seat 187 formed at the other end of sleeve 182 when pushed to the right from the position shown in the drawing. Rods 172, 173 to which reference has already been made are fixed to a cupped sleeve 188 that is arranged to move longitudinally within valve casing 177 against a coil spring 191, the latter biasing sleeve 188 to its extreme left position as shown in the drawing. The cupped portion of sleeve 188 receives the left end of a second coil spring 192. Rod 185 fits within spring 192, and the right end of the latter rests against a collar 193 formed on rod 185. Thus as rod 172 or 173 is moved in the direction of the arrow in Fig. 5, a force is applied against the left end of spring 192. The reaction produced by the spring is such as to cause a force to be exerted at its right end against collar 193, pushing rod 185 to the right so that the ball 186 enters seat 187. Continued movement of rod 172 or 173 then causes valve sleeve 182 to also move to the right so that the valve head 184 is removed from its seat. When this occurs, fluid can then pass from the high pressure inlet 178, through passageway 183 to the outlet port 181.

When valves 161, 162 are assembled and rollers 174 are in contact with plate 170, the operating parts of the valves occupy such a position that the valve head 184 is always removed from its seat. Thus, the valves 161, 162 are open at all times. With the plate 170 at the neutral position, as shown in the drawing, the two rods 172, 173 occupy like positions and the valves are equally open, but as the plate 170 is moved in one direction or the other, one of the rods, either 172 or 173, will be pushed in further while the other will be correspondingly forced out to thus increase the opening in one of the valves and simultaneously decrease the opening of the other.

The hydraulic system of Fig. 2 for supplying braking pressure to the brakes on wheels 14, 15 includes a valve 196 in the main high pressure supply conduit 197 that is controlled by solenoid 198 and switch 199. When solenoid 198 is energized by closing switch 199, the valve 196 is in an open position. When de-energized, this valve is closed. Fluid under pressure is supplied to the inlet ports of valves 161, 162 by means of conduits 200, 201 and 202 which connect as shown with the main conduit 197.

The outlet from the auxiliary control valve 161 is connected by conduit 203 to the brakes on the right wheel 15. Branching from conduit 203 is another conduit 204 which serves as a by-pass to the low pressure side or sump of the hydraulic system (not shown). A valve 205 controlled by solenoid 206 and switch 207 is inserted in the conduit 204.

The outlet from the auxiliary control valve 162 is connected by conduit 208 to the brakes on the left wheel 14. Branching from conduit 208 is another conduit 209 which also leads to the sump of the hydraulic system. Valve 211 controlled by solenoid 212 which is energized when switch 213 is closed is inserted in conduit 209.

Valves 205 and 211 are closed when the braking system is put into operation. They are opened when it is desired to release the brakes, thus relieving all brake pressure from the brake cylinders 114 by opening branch conduits 204 and 209 to the sump.

It has been found desirable to also include by-pass connections to the sump from the conduits connecting the cylinder 104' with the cylinder 165 of servomotor 163. Thus, conduit 166 is provided with a by-pass conduit 216 and valve 217 that is operated by solenoid 218 which is energized when switch 219 is closed. Similarly, conduit 167 is provided with a by-pass conduit 221 and valve 222 operated by solenoid 223 that is energized as switch 224 is closed. As with valves 205 and 211, the valves 217 and 222 are closed when the braking system is in operation but are opened when it is desired to release the brakes. Opening of valves 217 and 222 by-pass any fluid under pressure in the cylinder of the servomotor 163 to the sump.

*Operation of Fig. 2 system*

As with the system shown in Fig. 1, after the aircraft has been brought into alignment with the selected landing course, gyro 10 is uncaged by turning knob 25 and switch 199 is closed. This energizes solenoid 198 which then opens valve 196 to admit hydraulic fluid under pressure to the inlet port 111' of transfer valve 13'. Switches 207, 213, 219 and 224 are opened so as to close by-pass valves 205, 211, 217, and 222. When the aircraft is aligned with the selected landing course, the output signals from the gyro pick-offs 26 and 43 will be zero as previously explained in connection with the Fig. 1 system, and hence piston 119' in the transfer valve 13' will remain in a neutral position as shown in the drawing. Under this condition, the fluid pressure on both sides of piston 164 in cylinder 165 of servo 163 will be equal so that piston 164 is also maintained in a center position as shown in the drawing. Plate 170 will therefore be retained in the position shown with the result that valves 161 and 162 will be opened to the same extent. Thus, the fluid pressure at the outlets of valves 161, 162 will be equal, and hence equal fluid pressures will be transmitted through conduits 203 and 208 to thereby apply an equal braking force to the brakes on wheels 14 and 15.

As in the Fig. 1 system, so long as the aircraft remains on the selected landing course, the braking effects on the wheels 14, 15 will be equal. However, should the aircraft depart from such course, a signal will be produced by the pick-offs 26 and 43. Assuming that the aircraft veers off toward the right, this signal, when put through amplifier 55, produces unequal current flow through windings 124' and 128' which causes piston 119' to move from its central position. This increases the fluid pressure on one side of piston 164 and simultaneously decreases the pressure on the other side thereof. Piston rod 168 is thus caused to move and rotate plate 170 about its pivot 171. As plate 170 rotates, say in the direction of the arrow, rod 172 will move in a direction indicated by an arrow to thereby reduce the fluid pressure at the outlet port 181 of valve 161. Simultaneously, rod 173 will move in a direction indicated by an arrow to thereby increase the fluid pressure at the outlet port 181 of valve 162. Thus the pressure in brake line 208 and hence the braking force on left wheel 14 will be increased while the pressure in line 203 and braking force on right wheel 15 is simultaneously decreased. The increasing braking on the left wheel accompanied by a simultaneous decrease in braking of the right wheel turns the aircraft toward the left, putting it back on the selected course. Should the aircraft tend to veer towards the left, an opposite effect would take place, i. e., the braking on the right wheel 15 would be increased and that on the left wheel 14 would be simultaneously decreased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed is:

1. An automatic braking system for aircraft comprising, a plurality of braking means for said aircraft, a direction responsive device on said aircraft, a pick-off operated thereby to produce a signal corresponding to deviation of said aircraft from a preselected heading, turn rate device, a pick-off operated thereby to produce a signal corresponding to the rate-of-turn of said aircraft from said heading, and means controlled by both of said signals to establish a differential in braking effect in said plurality of braking means.

2. An automatic braking system for aircraft comprising, a plurality of braking means for said aircraft, a directional gyro on said aircraft, a pick-off operated thereby to produce a first signal proportional to the deviation of said aircraft from a preselected heading, a turn-rate gyro on said aircraft, a second pick-off operated thereby to produce a second signal proportional to the rate-of-turn of said aircraft from said heading, means combining said first and second signals, and means controlled by said combined signals to establish a difference in braking effect applied to each of said plurality of braking means.

3. An automatic braking system for aircraft comprising, a plurality of braking means for said aircraft, a directional gyro including a first pick-off operated thereby to produce a first signal corresponding to deviation of said aircraft from a preselected heading, a turn-rate gyro including a second pick-off to produce a second signal corresponding to the rate-of-turn of said aircraft from said heading, means controlled by said first and second signals to increase the braking effect on one of said braking means and to simultaneously decrease the braking effect on another of said braking means, and a follow-up device including a third pick-off actuated thereby for producing a third signal corresponding to the difference in braking effect applied to said plurality of braking means, said third signal being arranged to combine with said two other signals to limit the differential braking effect to a preselected degree for a given magnitude of said other signals.

4. An automatic braking system for paired landing wheels of an aircraft comprising, separate brake means for each of said wheels, a directional gyro, a pick-off operated thereby to produce a first signal corresponding to deviation of said aircraft from a preselected heading, a turn-rate gyro, a second pick-off operated thereby to produce a second signal corresponding to the rate-of-turn of said aircraft from said heading, means combining said first and second signals, and means controlled by said combined signals to establish a difference in the brake effect applied by said brake means.

5. An automatic braking system for aircraft comprising, a plurality of fluid operated braking means for said aircraft, a directional gyro, a first pick-off operated thereby to produce a first signal corresponding to deviation of said aircraft from a selected heading, a turn-rate gyro, a second pick-off operated thereby to produce a second signal corresponding to the rate-of-turn of said aircraft from said heading, means combining said first and second signals, a source of fluid pressure, conduit means connecting said source to said brakng means, and a transfer valve interposed in said conduit means for establishing the amount of fluid pressure applied to each of said braking means, said transfer valve being arranged to be controlled by said combined signals.

6. An automatic braking system for aircraft comprising, a plurality of fluid operated braking means for said aircraft, a directional gyro, a first pick-off operated thereby to produce a first signal corresponding to the deviation of said aircraft from a selected heading, a turn-rate gyro, a second pick-off operated thereby to produce a second signal corresponding to the rate-of-turn of said aircraft from said heading, a source of fluid pressure, conduit means connecting said source to said braking means, a transfer valve interposed in said conduit means for establishing a differential in the fluid pressure applied to each of said braking means, a follow-up device responsive to said pressure differential, said follow-up device including a third pick-off actuated thereby to produce a third signal corresponding to said differential pressure, and means combining all said signals, said transfer valve being arranged to be controlled by said combined signals.

7. An automatic braking system for aircraft comprising, a pair of fluid operated braking means for said aircraft, a directional gyro, a first pick-off operated thereby to produce a first signal corresponding to deviation of said aircraft from a selected heading, a turn-rate gyro, a second pick-off operated thereby to produce a second signal corresponding to the rate-of-turn of said aircraft from said heading, a source of fluid pressure, a transfer valve connected to said fluid pressure source for establishing differential fluid pressure outputs, a servomotor actuated in accordance with said outputs, a pair of control valves actuated by said servomotor for increasing the brake pressure applied to one of said braking means and simultaneously decreasing the pressure applied to the other of said braking means, a follow-up device including a third pick-off actuated by said servomotor to produce a third signal corresponding to the position of said servomotor, and means combining all said signals, said transfer valve being arranged for control by said combined signal.

CHARLES E. GALLAGHER.

REFERENCES CITED

The following references are of record in the file of this patent:

UNITED STATES PATENTS

| Number | Name | Date |
| --- | --- | --- |
| 1,662,306 | Fokker | Mar. 13, 1928 |
| 1,917,933 | Goodyear | July 11, 1933 |
| 2,234,326 | Tiebel | Mar. 11, 1941 |
| 2,382,727 | Kronenberger | Aug. 14, 1945 |